W. D. KNIGHT.
PLOW.
APPLICATION FILED SEPT. 6, 1921.

1,421,011.

Patented June 27, 1922.
2 SHEETS—SHEET 1.

INVENTOR:
W. D. KNIGHT,
by W. J. FitzGerald & Co.
ATTORNEY.

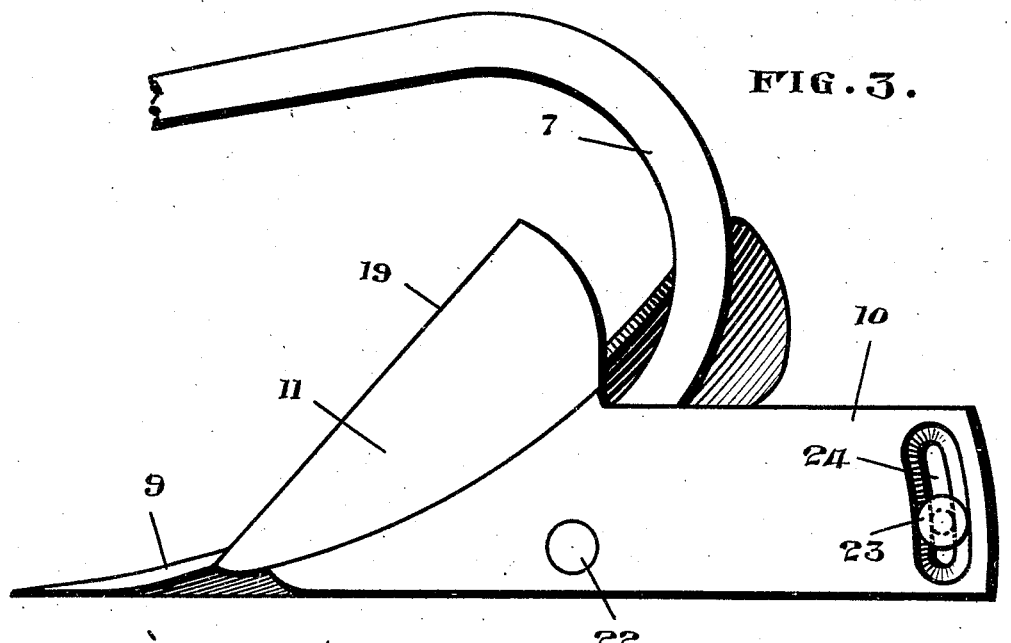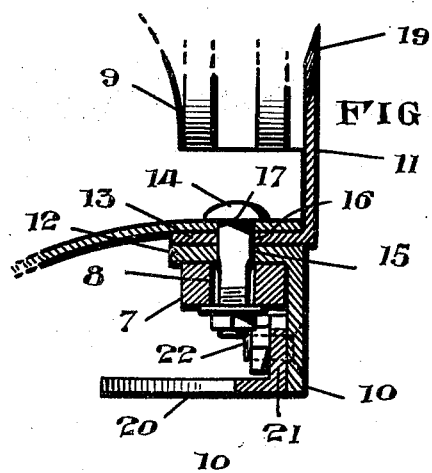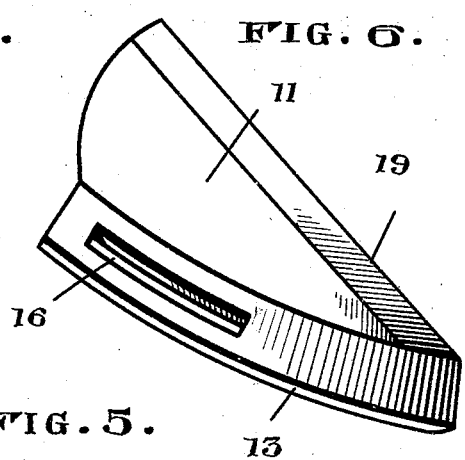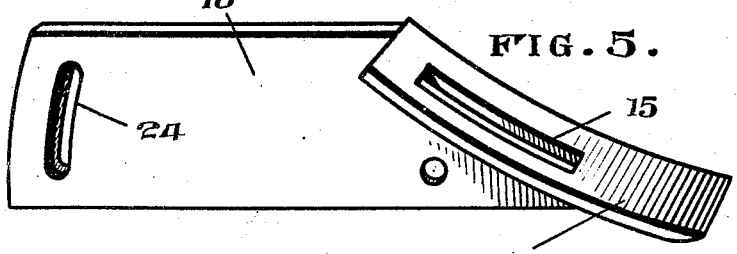

UNITED STATES PATENT OFFICE.

WESLEY DOWELL KNIGHT, OF McDONOUGH, GEORGIA.

PLOW.

1,421,011.  Specification of Letters Patent.  Patented June 27, 1922.

Application filed September 6, 1921. Serial No. 498,632.

*To all whom it may concern:*

Be it known that I, WESLEY D. KNIGHT, a citizen of the United States, residing at McDonough, in the county of Henry and State of Georgia, have invented certain new and useful Improvements in Plows; and I do hereby declare the following to be a full, clear, and exact description of the invention, such as will enable others skilled in the art to which it appertains to make and use the same.

The present invention relates to plows, and aims to provide such a soil working implement of novel and improved construction, in order that same is comparatively simple in construction, economical to manufacture, and efficient in use.

Another object is the provision of a plow including a share and moldboard, landside and shin colter assembled with one another and with the beam in a novel manner for the relative adjustment of such parts and the effective attachment thereof to the beam.

A further object is the provision of a shoe or runner carried by the landside in a novel manner to assist in supporting and guiding the plow.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Fig. 3 is an opposite side elevation.

Fig. 4 is a section on the line 4—4 of Fig. 2.

Fig. 5 is a perspective view of the landside.

Fig. 6 is a perspective view of the shin colter.

Figure 1:
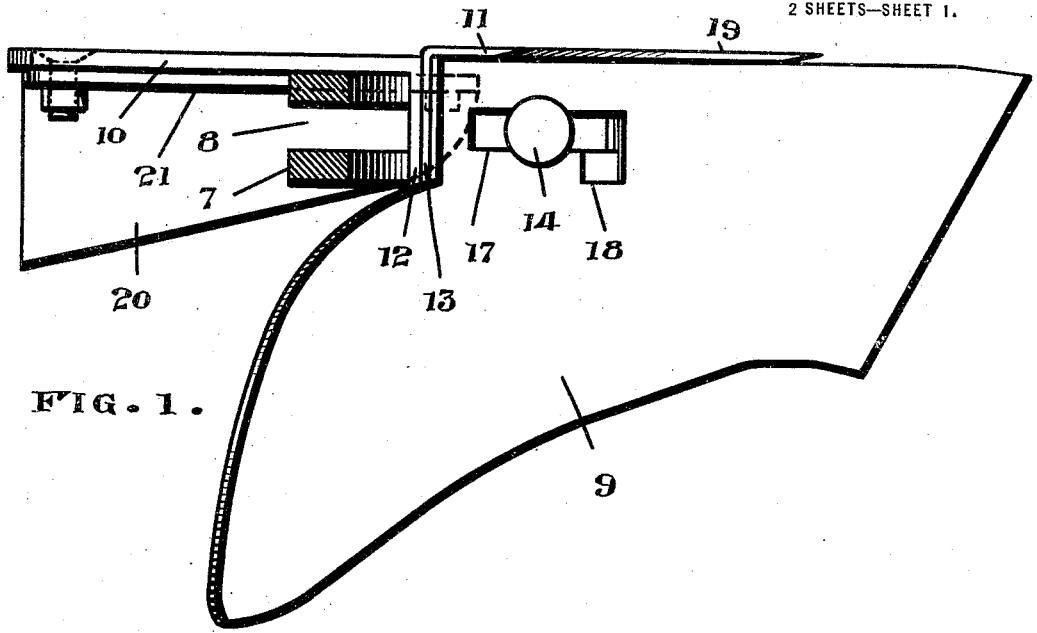
Figure 1 is a plan view of the plow, showing the beam in section.
Figure 2:
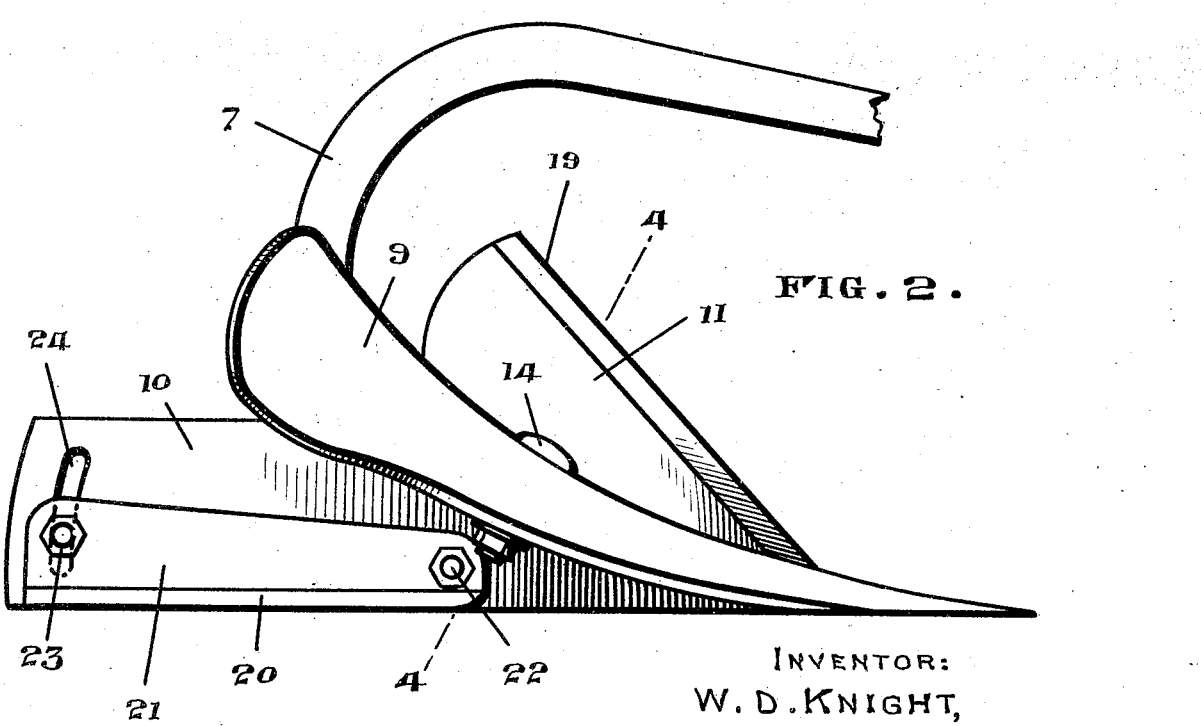
Fig. 2 is a side elevation.

The plow beam 7 is of ordinary construction, having its rear terminal curved downwardly and forwardly, to provide a standard provided with a longitudinal slot 8 between the opposite sides thereof. The plow includes the share and moldboard or blade 9, landside 10, and shin colter or cutter blade 11.

The landside 10 is provided at its forward end with an inclined flange 12 extending laterally and adapted to overlap and seat on the beam or standard 7, and the shin colter or cutter blade 11, which is disposed in a longitudinal vertical plane substantially coinciding with the plane of the landside 10, is provided at its lower edge with a flange 13 extending laterally in the same direction as the flange 12 and adapted to fit on and seat against the flange 12. The landside edge portion of the blade 9 overlaps and seats on the flange 13 and abuts the colter 11. The flanges 12 and 13 and blade 9 thus overlap one another over the beam 7, and a clamping bolt 14 extends through said flanges 12 and 13 and blade 9, and through the slot 8 of the beam, for clamping said parts together. The flanges 12 and 13 have longitudinal slots 15 and 16, respectively, through which the bolt 14 extends, thereby permitting of the adjustments of the landside 10 and colter 11 relatively to and along the beam 7, to position said landside and colter in different relations as found most efficient. The share and moldboard blade 9 also have a longitudinal slot 17 through which the bolt 14 extends, to permit said blade to be adjusted forwardly and rearwardly as well as the landside and colter. The forward end of the slot 17 has an extension 18 projecting at an angle away from the landside, for receiving a special form of bolt having its head extending to one side to pass through such extension 18 or having an L-shaped head. The landside edge of the blade 9 abutting the colter 11, and said colter being clamped tightly on the beam, will prevent the blade 9 from being displaced.

The colter or blade 11 has an upper inclined sharpened edge 19 to split or cut the soil in the plane of the landside 10, so that the soil is turned more easily and evenly by the blade 9.

A shoe or runner 20 is disposed at the inner side of the landside 10, and increases in width from its forward to its rear end. Said shoe or runner has an upstanding flange 21 along one edge bearing against the landside 10 and pivoted at its forward end portion to the landside by means of a pivot bolt 22, thereby permitting the shoe 20 to be raised and lowered to different angular positions. A bolt 23 is engaged through the flange 21 near the rear end thereof and extends through an arcuate slot 24 in the landside 10, for clamping the flange 21 in different adjusted positions. The shoe or runner 20 in bearing and sliding on the bottom of the furrow will assist in supporting and guiding the plow.

The blade 9, landside 10, shin colter 11 and shoe or runner 20 can all be readily stamped or forged from sheet metal, providing for inexpensive manufacture, and the parts when assembled provide a substantial construction which is adjustable to suit the conditions of the soil.

Having thus described the invention, what is claimed as new is:—

1. A plow comprising a landside having a flange at its forward end to overlap the standard, a shin colter having a flange to overlap the landside flange, a blade to overlap one of said flanges, and means for clamping said blade and flanges on the standard.

2. A plow comprising a landside having a flange at its forward end to overlap a standard, a shin colter having a flange to overlap the landside flange, a share and moldboard blade to overlap the colter flange, and means for clamping said blade and flanges on the standard.

3. A plow comprising a landside having an inclined flange at its forward end to fit on a plow standard, a shin colter having a lower flange to fit on the landside flange, a share and moldboard blade to overlap the colter flange and abut said colter, said blade and flanges having longitudinal slots, and clamping means to extend through said slots for clamping said blade and flanges on the standard.

In testimony whereof I have signed my name to this specification in the presence of two subscribing witnesses.

WESLEY DOWELL KNIGHT.

Witnesses:
C. R. HAND,
C. W. BANKSTON.